United States Patent [19]
Van den Nieuwelaar et al.

[11] Patent Number: 5,222,905
[45] Date of Patent: Jun. 29, 1993

[54] APPARATUS FOR DECROPPING POULTRY

[75] Inventors: Andrianus J. Van den Nieuwelaar, Gemert; Petrus C. M. Janssen, Wilbertoord, both of Netherlands

[73] Assignee: Stork PMT B.V., Boxmeer, Netherlands

[21] Appl. No.: 900,065

[22] Filed: Jun. 16, 1992

Related U.S. Application Data

[63] Continuation-in-part of Ser. No. 539,084, Jun. 15, 1990, Pat. No. 5,122,090.

[51] Int. Cl.$^5$ .............................................. A22C 25/16
[52] U.S. Cl. ........................................ 452/116; 452/117
[58] Field of Search .................. 452/116, 117, 118, 106

[56] References Cited

U.S. PATENT DOCUMENTS

| | | | |
|---|---|---|---|
| 4,208,764 | 6/1980 | Loth et al. | 17/45 |
| 4,610,050 | 9/1986 | Tieleman et al. | 452/117 |
| 4,910,829 | 3/1990 | Simmons | 452/116 |
| 4,958,408 | 9/1990 | Meyn | 452/117 |
| 5,122,090 | 6/1992 | Van den Nieuwelaar et al. | 452/116 |

FOREIGN PATENT DOCUMENTS

| | | | |
|---|---|---|---|
| 0178825 | 4/1986 | Denmark | 21/6 |
| 0354603 | 2/1990 | Netherlands | 21/6 |
| 8801707 | 2/1990 | Netherlands | 21/6 |

Primary Examiner—Willis Little
Attorney, Agent, or Firm—Deveau, Colton & Marquis

[57] ABSTRACT

An apparatus for decropping poultry including a probe for use with an automatic poultry cropping machine of the type adapted for advancing the probe through the belly cavity of the bird and into the neck and for rotating the probe. The probe includes an elongate body having a hollow interior chamber and adapted to be connected to a vacuum source. The elongate body has two rows of teeth for capturing the crop, gullet, windpipe, etc., of the poultry as the probe is advanced into the neck and rotated, with at least some of the teeth pointing generally toward the forward end of the probe. In one embodiment the elongate body is tapered and the teeth have ball-shaped tip portions.

12 Claims, 4 Drawing Sheets

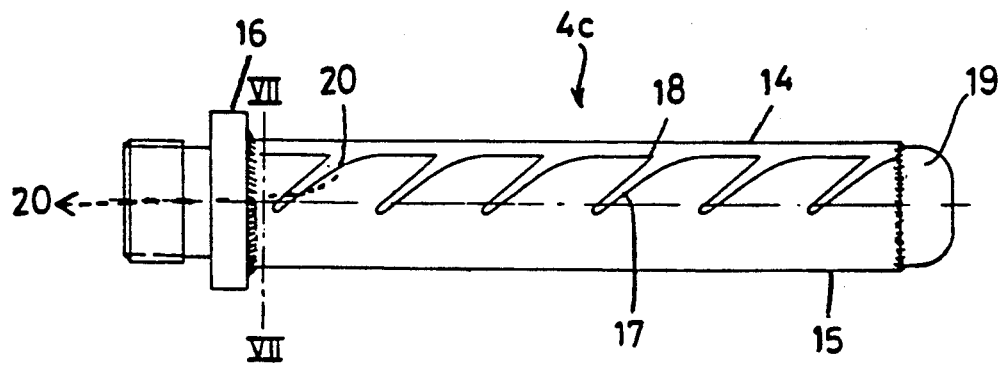
FIG: 6.
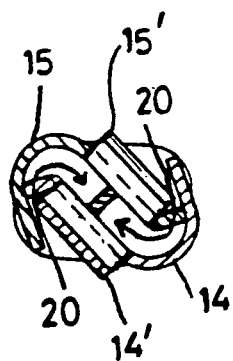
FIG: 7.

APPARATUS FOR DECROPPING POULTRY

CROSS REFERENCE TO RELATED APPLICATIONS

The present application is a continuation-in-part of U.S. patent application Ser. No. 07/539,084 filed Jun. 15, 1990, for "Decropping Device For Poultry", expected to be issued as U.S. Pat. No. 5,122,090.

TECHNICAL FIELD OF THE INVENTION

This invention relates to a method and apparatus for the removal of the gullet, crop, windpipe and adhering parts from the neck part of slaughtered poultry.

BACKGROUND OF THE INVENTION

In the field of poultry processing, it is generally known to use a rotary mandrel (i.e., a bore or probe) conveyed through the belly cavity of the bird and into the neck opening of the bird for the removal of the gullet, crop, windpipe, etc. Such a device is known from published European Patent Application EP-Al-0,162,154, in which a so-called "decropper" is used in mechanized and automated slaughtered systems for poultry. After evisceration, parts of the gullet, windpipe, crop and any adhering parts can be left behind in the neck region of the poultry, and must be removed for hygienic and marketing reasons.

This removal can be carried out with the decropper which is known per se. It is important here first of all that the removal should take place with great certainty. Insufficiently decropped birds have to be returned to the decropper again after inspection. This leads to a lower capacity of the slaughter system, or to higher slaughter costs for the same capacity.

Secondly, it is important that the decropping takes place in such a way that the poultry is not damaged. This could involve damage to or breakage of bones of the poultry and damage to meat or skin of the poultry.

Thirdly, partly in view of the trend towards a high degree of automation in slaughter systems, it is increasingly important that the operations carried out on the poultry are carried on in such a way that as much meat as possible becomes available as an end product.

In order to meet the first requirement, the mandrel of the above-described decropper (EP-Al-0,162,154) must have a certain minimum diameter, so that when the mandrel is inserted into the neck opening the neck is stretched somewhat. This decropper will therefore not be able to meet the second and third requirements because the forces exerted by the mandrel on the neck opening can lead to damage of bone and/or meat.

Other decroppers are also known per se, such as the decropper according to U.S. Pat. No. 4,208,764. The latter generally cannot meet the second and third requirements because the mandrel used is provided with angular, radially directed projections. Moreover, the neck region is pulled additionally against these angular parts, due to the vacuum used.

The decropper known from Dutch Patent Application NL-A-8303633 generally cannot meet the second and third requirements because the mandrel used therein is provided at its end with forward-pointing projections which are of such a shape that there is a great risk of damage to bones and meat through the action of the pointed projections thereon. Similar disadvantages are demonstrable for the decropper according to European Patent No. EP-Bl-0,178,825.

From European Patent No. EP-Bl-0,204,366 a decropper is known which does meet the three requirements through the fact that the actual working mandrel thereof is partially enclosed by a non-rotating smooth cylinder moving with the mandrel in the axial direction. This decropper is however, mechanically more complex than a decropper with only a mandrel.

Finally, reference is made to a decropper from Dutch Patent Application NL 8801707, which meets the second and third requirements by avoiding the use of pointed and angular parts in the mandrel. However, the first requirement is met only to a lesser extent.

Accordingly, it can be seen that a need yet remains for a method and apparatus for decropping poultry which is effective for reliably decropping poultry with certainty, avoids or minimizes damage to skin, meat, and bones, and results in an efficient recovery of meat with minimal waste. It is to the provision of such a method and apparatus that the present invention is primarily directed.

SUMMARY OF THE INVENTION

Briefly described, in a preferred form the present invention comprises a probe for use with an automatic poultry cropping machine of the type adapted for advancing a probe through the belly cavity of the bird and into the neck of the bird and for rotating the probe. The probe comprises an elongate body having a forward portion and a rear portion opposite the forward portion. The rear portion is adapted to be mounted to, and driven by, the automatic poultry cropping machine. The elongate body comprises one or more teeth for capturing the crop, gullet, windpipe, etc., of the poultry as the probe is advanced into the neck and rotated. Each of the teeth extend generally in the direction of rotation of the body and includes a tip portion. The elongate body has a hollow interior chamber and is adapted to be connected to a vacuum source. Furthermore, the body includes one or more apertures communicating from the exterior of the body generally adjacent the teeth to the hollow interior chamber.

In another preferred form, the elongate body is generally tapered and the teeth are generally ball-shaped to minimize damage to the neck skin, while effectively and reliably capturing the crop, gullet, windpipe, etc. Lateral dimensions of the body through the tip portions of the teeth taper from a first dimension adjacent the rear portion of the body to a second, smaller dimension adjacent the forward portion of the body.

Through these measures, in particular the vacuum, and the addition in the second preferred form of the conical shape of the probe along with the ball-shaped tips, the size of the probe can be selected such that forces exerted on the neck part of the poultry are minimized. In particular, it is possible to reduce forces stretching the neck part or forces in the case of which the internal neck opening is stretched. Through the action of the vacuum, the inside of the neck opening is brought into intimate contact with the probe.

Accordingly, it is a primary object of the present invention to provide a method and apparatus for decropping poultry which is efficient in operation, reliable, and effective in use.

It is another object of the present invention to provide a method and apparatus for decropping poultry which reliably decrops the poultry with certainty.

It is another object of the present invention to provide a method and apparatus for decropping poultry which avoids or minimizes damage to skin, meat, and bones.

It is another object of the present invention to provide a method and apparatus for decropping poultry which results in an efficient recovery of meat with minimal waste.

Other objects, features, and advantages of the present invention will become apparent upon reading the following specification in conjunction with the following drawing figures.

BRIEF DESCRIPTION OF THE DRAWINGS

FIG. 6 shows a side view of yet another embodiment;

FIG. 7 shows a cross-section along the line VII—VII in FIG. 6.

DETAILED DESCRIPTION OF THE PREFERRED EMBODIMENTS

Figure 1:
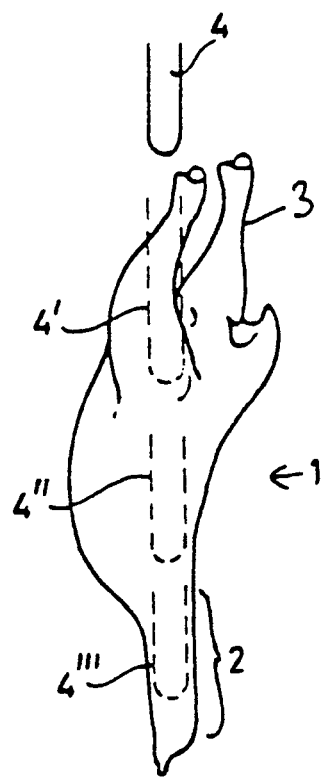
FIG. 1 shows a bird being decropped.

Referring now in detail to the drawing figures, wherein like reference characters depict like parts throughout the several views, FIG. 1 shows a bird 1, such as a chicken, turkey, etc., with neck part 2 and legs 3. The decropper 4 is shown schematically, as are the successive positions 4', 4", and 4'" thereof. In general, the bird hangs by the legs in a hook which moves along a conveyor track for conveying the birds past different processing stations.

Figure 2:
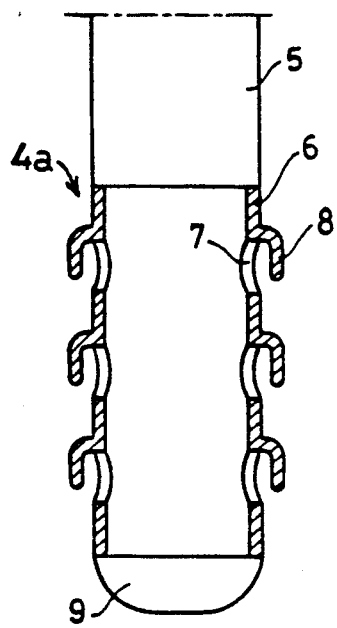
FIG. 2 shows the cross-section of an embodiment of the device.

FIG. 2 shows in cross-section an embodiment of a decropper 4a according to the invention which is a part of a vacuum system, and for this purpose is connected by the top part 5 to a channel (not shown) which is connected to a vacuum pump. The operating part of the decropper 4a consists of a mandrel or probe in the form of a hollow cylinder 6, the wall of which is designed with, in this case, circular holes 7. Gripping means 8 are fitted on the outside of the hollow cylinder, in the vicinity of the holes, for gripping the parts to be removed from the birds. In this case they are formed by a lip 8 which partially overlaps the hole 7 and is welded on just above said hole. The hollow cylinder is shut off at the bottom side by a cover 9.

Figure 3:
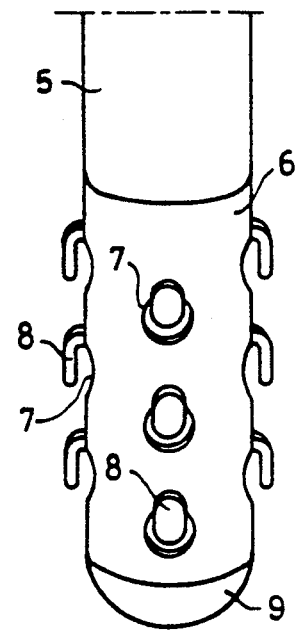
FIG. 3 shows a variant of the embodiment according to FIG. 2.

FIG. 3 shows the decropper in perspective view.

Figure 4:
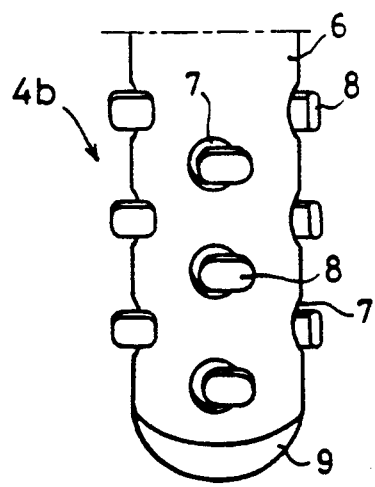
FIG. 4 shows another embodiment.

FIG. 4 shows another embodiment in perspective view; in the case of this decropper 4b each lip 8 is welded onto the side of a hole 7.

If the decropper is put into the neck part of the bird, the neck part is pulled around the probe of the decropper through the action of the vacuum present in the decropper, which constitutes an ideal situation, because the gripping means grips the gullet, windpipe, etc., with certainty. These parts to be removed are carried along with the rotary decropper through and past the neck part 2. When the decropper has come out of the neck part of the bird, the adhering parts are removed from the decropper and the decropper is cleaned before being pulled back through the neck part.

Figure 5:
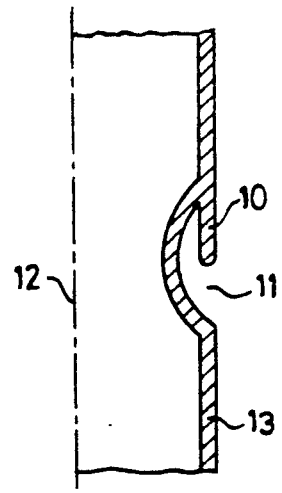
FIG. 5 shows in cross-section an embodiment of a gripping means/hole configuration.

FIG. 5 shows a cross-section of a possible configuration of a gripping means 10 in conjunction with an opening 11 of the vacuum system. This configuration is a part of a decropper probe with an axis of rotation 12 which is not shown in any further detail. The advantage of this configuration is that the fixing means 10 lies entirely inside the outer wall 13 of the decropper probe body. Therefore the decropper probe has no projecting parts, so that the risk of damage to bones or meat is further reduced, particularly if the decropper body is a cylinder with axis 12.

FIGS. 6 and 7 show yet another embodiment of a decropper probe 4c. The latter is composed of two parallel, curved elements 14 and 15 which are fixed to straight elements 14' and 15', the latter in turn being fastened to the end 16 of the decropper. Parts 14, 15, 14' and 15' form the mandrel of this decropper. The elements are designed with incisions or gripping means 17, which end in a point 18. Advantageously, the ends of the curved elements are directed in such a way that they essentially point in the direction of a tangent on the circle which the end of the curved element describes during rotation of the decropper. The decropper also is provided with a front side 19 which forms part of the wall of the vacuum system; the path of air drawn in by the vacuum system is indicated by the arrow 20.

Figures 8A, 8B, 9A, 9B:
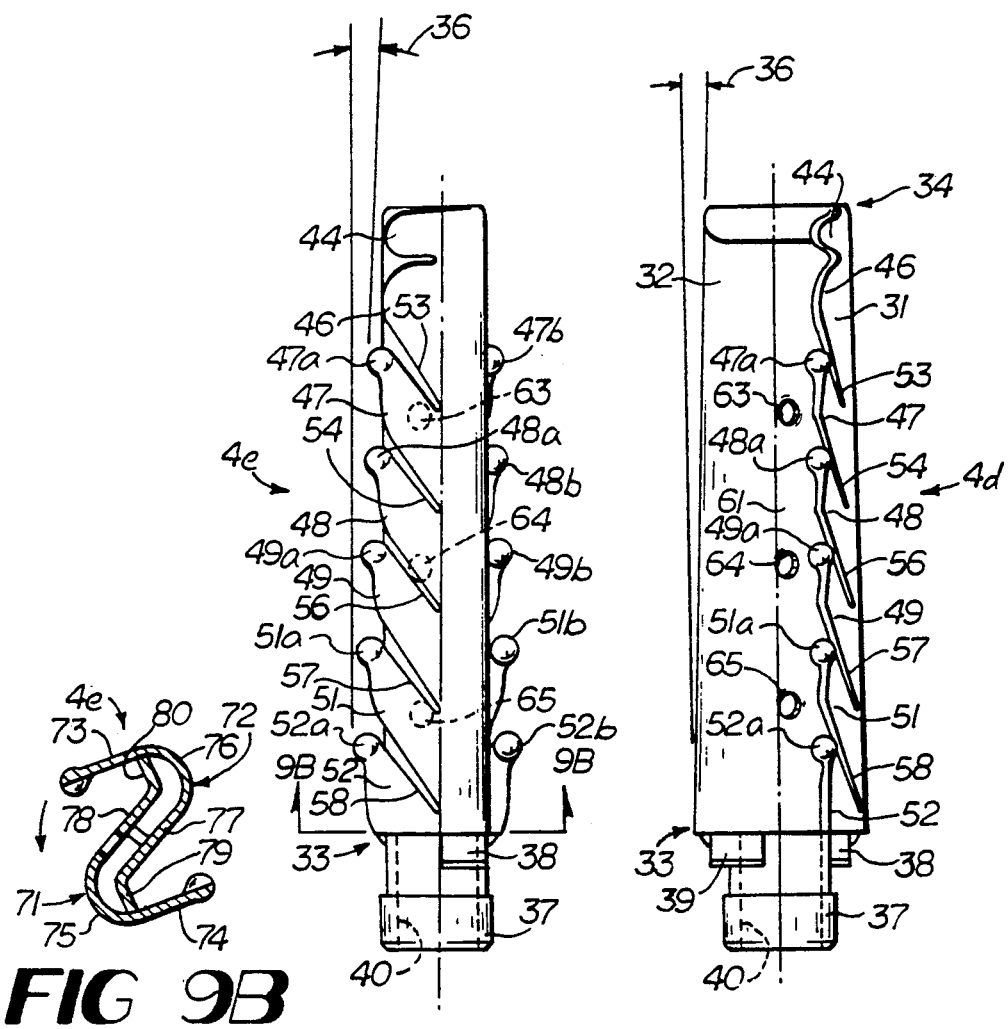
FIG. 8A is a side elevation view of a tapered probe according to another preferred form of the invention.
FIG. 8B is a plan view of the tapered probe of FIG. 8A.
FIG. 9A is a front elevation view of a slightly modified form of the tapered probe of FIG. 8A.
FIG. 9B is a section view taken along the lines A—A of FIG. 9A.

Referring now to FIGS. 8A and 8B, another preferred form of the decropper probe is shown, specifically decropper probe 4d. The decropper probe 4d is comprised of two generally U-shaped elongate channel members 31 and 32 which extend from a first end 33 to a second end 34 generally opposite the first end 33. The U-shaped channel members 31 and 32 are tilted toward one another so that the lateral dimension of the decropper probe 4d tapers from a maximum dimension adjacent end 33 to a minimum dimension adjacent end 34. The angle of taper 36 preferably is 2 ¼°, although other angles, greater or less can be employed as conditions require. The tapered nature of the decropper probe 4d eases insertion of the decropper probe into the neck opening of the bird to minimize damage to the neck and to the neck opening upon insertion. The tapered outer shape also helps the decropper probe 4d to better conform to the somewhat tapered shape of the neck of the bird.

Adjacent to end 33 of the decropper probe 4d is a driven part 37 to be mounted to the decropping machine, which driven part comprises ears 38 and 39 for receiving rotational power from the cropping machine. The driven part 37 is hollow and includes a passageway 40 for communicating reduced air pressure (vacuum) to an interior portion 41 of the decropper probe 4d.

First and second rows of teeth 42 and 43 are formed along opposite sides of the decropper probe 4d at outer end portions of each of the U-shaped channel members 31 and 32. Each of the rows of teeth 42, 43 includes first and second blunt teeth 44, 46 which are oriented to lie on the circle of rotation of the teeth (i.e., they do not extend outwardly) for easing insertion of the decropper probe 4d into the neck opening and into the neck of the bird. The end 34, including the blunt teeth 44, 46, tends to open the neck, which is generally resilient, of the slaughtered bird. For this purpose, blunt teeth are well-suited.

Following the teeth 44, 46, are somewhat more pointed teeth, such as teeth 47, 48, 49, 51, and 52. Each of the somewhat sharper teeth 47, 48, 49, 51, and 52 includes a rounded or ball-shaped tip portion 47a, 48a, 49a, 51a, and 52a, which tend to avoid damage to the meat, skin, and bones. Tapered slots, such as slots 53, 54, 56, 57, and 58 are formed between the adjacent ones of the teeth for catching the crop and other parts within the neck of the bird. The teeth, such as the row of teeth 42 including the ball-shaped tips and the slots of the first elongate channel member 31, make up an outer portion of the channel member and are positioned generally over a flat, inner portion 61 of the other U-shaped channel member 32. Likewise, the teeth 43 of the U-shaped channel member 32 are positioned over a flat inner portion 62 of U-shaped channel member 31.

One or more apertures, such as apertures 63, 64, and 65 communicate from the hollow interior region 41 of the decropper probe 4d to the exterior of the decropper probe generally adjacent the teeth 42, and unshown apertures formed in U-shaped channel member 31 communicate from the hollow interior region 41 to the exterior of the decropper probe generally adjacent the teeth 43. While three apertures per row of teeth are shown, it will be understood that fewer or more such apertures can be employed as required. Moreover, the apertures can be generally positioned beneath the slots or beneath the solid parts of the teeth.

Referring now to FIGS. 9A and 9B, a slightly modified form of the decropper probe 4d is illustrated in which the elongate channel members 31 and 32 of FIG. 8A and 8B are replaced with channel members having a generally U-shaped configuration, but also including a "dog-leg" portion, as will be explained in more detail below. Referring specifically to FIG. 9B, it can be seen that the decropper probe 4e includes first and second elongate channel members 71 and 72 which are generally U-shaped, each including a flat outer portion 73, 74, a bend portion 75, 76, a flat inner portion 77, 78, and a dog-leg portion 79, 80. From FIG. 9B, it can be seen that the dog-leg portions 79, 80 are engaged against the flat outer portions 73, 74 so as to provide additional support against bending of the flat outer portions and to generally provide additional rigidity. Otherwise, the construction of the remainder of the decropper probe 4e is substantially the same as that in FIGS. 8A and 8B. FIG. 9A also shows the second row of teeth having ball-shaped tips 47b, 48b, 49b, 51b, and 52b.

While the invention has been disclosed in preferred forms only, it will be understood by those skilled in the art that many modifications, additions, and deletions can be made therein. For example, while it is contemplated that the probe according to the invention normally would be advanced through the belly cavity of the bird and into the neck opening, the probe can also be advanced from the exterior of the bird directly into the neck opening. This and other modifications fall within the spirit and scope of the invention as set forth in the following claims.

What is claimed is:

1. A probe for use with an automatic poultry decropping machine of the type adapted for advancing the probe into and through the neck opening of a bird and for rotating the probe, the probe comprising:

an elongate body having a forward portion and a rear portion opposite said forward portion, said rear portion being adapted to be driven by the automatic poultry decropping machine, said elongate body comprising a plurality of teeth partially extending substantially in the direction of rotation of the body for capturing the crop, gullet, windpipe, etc., of the bird as the probe is advanced into the neck and rotated, said elongate body having a hollow interior region and being adapted to be connected to a vacuum source, said elongate body further comprising one or more apertures communicating from the exterior of said body to said hollow interior region.

2. A probe as claimed in claim 1, wherein the apertures are generally adjacent said plurality of teeth.

3. A probe as claimed in claim 1, wherein said plurality of teeth comprises first and second rows of teeth, said first and second rows being positioned generally opposite each other.

4. A probe as claimed in claim 1, wherein said teeth comprise tip portions which are generally rounded.

5. A probe as claimed in claim 1 wherein said elongate body comprises first and second generally U-shaped elongate channel members.

6. A probe as claimed in claim 5 wherein each of said generally U-shaped elongate channel members includes an inner section and an outer section, with said outer section of said first U-shaped channel member positioned generally over said inner section of said second U-shaped channel member and said outer section of said second U-shaped channel member positioned generally over said inner section of said first U-shaped channel member.

7. A probe as claimed in claim 5 wherein said plurality of teeth comprises first and second rows of teeth formed in said outer sections of said first and second U-shaped channel members, respectively.

8. A probe as claimed in claim 7 wherein said plurality of teeth comprises first and second rows of teeth, said first and second rows being positioned generally opposite each other.

9. A probe as claimed in claim 1 wherein said elongate body is generally conical and said teeth comprise tip portions, with lateral dimensions of said body through said tip portions tapering from a first dimension adjacent said rear portion to a second, smaller dimension adjacent said forward portion.

10. A probe as claimed in claim 1 wherein said teeth comprise tip portions which are generally rounded.

11. A probe as claimed in claim 6 wherein said tip portions are generally ball-shaped.

12. A probe as claimed in claim 1 wherein at least some of said teeth comprise tips which are pointed generally outwardly relative to a circle of revolution generated by said tips as the probe is rotated.

* * * * *